Patented Aug. 27, 1946

2,406,649

UNITED STATES PATENT OFFICE 2,406,649

LIQUID COATING COMPOSITION AND PROCESS OF MAKING SAME

George Witty, Long Island City, N. Y.

No Drawing. Application November 30, 1944,
Serial No. 566,031

1 Claim. (Cl. 260—15)

Many efforts have heretofore been made to produce a coating composition of this character, but whether by reason of expense of manufacture or other inherent defects, they have not been productive of satisfactory results.

The object of this invention is to produce a liquid coating composition suitable for coating paper and paper goods, metals, glass, wood, and similar substances, and having the useful properties among which may be the qualities of being economical, free from precipitation, blushing, blooming and sagging, which defects are frequently encountered in the formulation and application of finishing coating compositions.

Another object of this invention is to provide a liquid coating composition which is free flowing, flexible, highly transparent, resistant to wear and weather, and which will not crack, chip or peel off.

A further object of this invention is to produce a liquid coating composition which will retain permanently its opacity, color and brilliancy, and which is adapted for application by brushing, dipping or spraying.

A further object of this invention is to provide a liquid coating composition which can be made suitable for being colored fast to light by the addition of basic dyestuff.

A further object of this invention is to provide a liquid coating composition which is substantially non-inflammable, that exhibits a marked resistance to discoloration by light and heat; that does not have ingredients which tend to hydrolize and form acidic products, that is relatively low in cost, that is highly transparent; that does not cause a bloom, cloudiness, silking and sagging; and that is otherwise highly satisfactory for its intended purpose.

The following formula produces excellent results. However, it is understood that this formula is given merely by way of illustration, and that the invention is not limited thereto.

| | Parts |
|---|---|
| Cellulose acetate | 100 |
| Ground Santolite rosin | 50 |
| Triphenyl phosphate | 20 |
| Acetanilide | 10 |

With the formula given above, I prefer to use a solvent composed of 300 parts acetone, 150 parts ethyl alcohol, 50 parts ethyl lactate and 20 parts triethyl citrate. All the parts are by weight.

If desired a soluble dye or lakes of any particular color may be incorporated in the mixture, to produce an unlimited variety of colors or shades.

The ingredients are placed in a mixing machine of commercial use and thoroughly dissolved until a uniform flowable solution is obtained. The mixture is then strained and placed in containers ready for use.

The "Santolite M. H. P." is a toluene sulfonamide-formaldehyde resin. See page 563 of Physical Chemical Examination of Paints, Varnishes, Lacquers and Colors by Henry A. Gardner 1939.

Owing to the great miscibility or physical affinity of said resins a especially Santolite resins for the cellulose acetate or organic derivative of cellulose, it is possible to dispense with the employment of the usual plasticizers in making the solutions, dopes, varnishes, preparations, films, compositions, articles or products as the resin can be intimately incorporated with and assimilated by the cellulose acetate or cellulose derivative even with a relatively small proportion of a solvent or solvent mixture.

Although one specific embodiment and certain preferred ingredients and proportions thereof have been described, it should be understood that equivalent ingredients may be used without departing from the spirit or scope of the invention, as expressed in the following claim.

Having now described my invention what I claim as new and desire to secure by Letters Patent is:

A liquid coating composition comprising 100 parts cellulose acetate, 50 parts toluene sulfonamide-formaldehyde resin, 20 parts triphenyl phosphate and 10 parts acetanilide dissolved in solvent mixture consisting of 300 parts acetone, 150 parts ethyl alcohol, 50 parts ethyl lactate and 20 parts triethyl citrate, all the parts are by weight.

GEORGE WITTY.